United States Patent
Dawson et al.

(10) Patent No.: US 10,419,113 B2
(45) Date of Patent: Sep. 17, 2019

(54) OPTICAL COMMUNICATIONS SYSTEM PHASE-CONTROLLED TRANSMITTER AND PHASE-CONJUGATE MIRROR RECEIVER

(71) Applicant: The Charles Stark Draper Laboratory, Inc., Cambridge, MA (US)

(72) Inventors: Robin Mark Adrian Dawson, Watertown, MA (US); Juha Pekka Laine, Boston, MA (US); Steven Spector, Cambridge, MA (US); Murali Chaparala, Newton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/603,497

(22) Filed: May 24, 2017

(65) Prior Publication Data
US 2017/0346565 A1 Nov. 30, 2017

Related U.S. Application Data

(60) Provisional application No. 62/340,582, filed on May 24, 2016.

(51) Int. Cl.
| | |
|---|---|
| *H04J 14/08* | (2006.01) |
| *H04B 10/112* | (2013.01) |
| *H01Q 3/26* | (2006.01) |
| *H04B 10/071* | (2013.01) |
| *H04B 7/185* | (2006.01) |

(52) U.S. Cl.
CPC ....... *H04B 10/1123* (2013.01); *H01Q 3/2676* (2013.01); *H04B 7/18504* (2013.01);
(Continued)

(58) Field of Classification Search
CPC ....................................... H04J 14/08
See application file for complete search history.

(56) References Cited

U.S. PATENT DOCUMENTS

| 9,363,015 B2 | 6/2016 | Voelker et al. |
| 2001/0035995 A1* | 11/2001 | Ruggiero ........... H04B 10/1121 398/118 |

(Continued)

FOREIGN PATENT DOCUMENTS

WO 01/78262 A2 10/2001

OTHER PUBLICATIONS

Stadler, B., et al., "Terahertz Operational Reachback (THOR) a Mobile Free Space Optical Network Technology Program," Aerospace Conference, IEEE, 1710-1721 (2004).

(Continued)

*Primary Examiner* — Omar S Ismail
(74) *Attorney, Agent, or Firm* — HoustonHogle LLP (57) ABSTRACT

An optical communications system comprises a first node comprising a phased array transmitter for generating an optical beam and a receiver, and a second node comprising a phase conjugate mirror for returning the optical beam to be detected by the receiver of the first node. The phased array transmitters allow for electronic steering of the beams in a way that is much faster and with a potentially smaller physical footprint than the mechanical systems. The phase conjugate mirrors return the received beams of photons back over the exact path they were sent from the phased array transmitters, ensuring continuity of communication even in the presence of atmospheric turbulence.

17 Claims, 6 Drawing Sheets

(52) U.S. Cl.
CPC ....... *H04B 10/071* (2013.01); *H04B 10/1129* (2013.01); *H04J 14/08* (2013.01)

(56) References Cited

U.S. PATENT DOCUMENTS

| | | | | |
|---|---|---|---|---|
| 2006/0227317 | A1* | 10/2006 | Henderson | G01B 11/026 356/28 |
| 2010/0271614 | A1* | 10/2010 | Albuquerque | G01S 7/4811 356/4.01 |
| 2011/0176565 | A1* | 7/2011 | Hutchin | G01S 17/66 372/27 |
| 2015/0069216 | A1* | 3/2015 | Hutchin | G01J 1/4257 250/201.9 |
| 2017/0234984 | A1* | 8/2017 | Khial | G01S 17/42 356/5.1 |

OTHER PUBLICATIONS

International Search Report and Written Opinion of the International Searching Authority, dated Nov. 24, 2017, from International Application No. PCT/US2017/034114, filed on May 24, 2017. 19 pages.

Heck, M.J.R., "Highly integrated optical phased arrays: photonic integrated circuits for optical beam shaping and beam steering," Nanophotonics, vol. 6, No. 1, 2017, pp. 93-107. Fifteen pages.

Lee, J. et al., "Giant nonlinear response from plasmonic metasurfaces coupled to intersubband transitions," Nature, vol. 511, Jul. 3, 2014, pp. 65-69 ff. Eleven pages.

Lehar, S., "An Intuitive Explanaton of Phase Conjugation," http://cns-alumni.bu.edu/~slehar/PhaseConjugate/PhaseConjugate.html. Nine pages.

Shimayabu, K. et al., "Optical Intersatellite Communication System with Double Phase Conjugate Mirror," Proceedings of the 2008 Fourteenth European Conference on Optical Communication, IEEE 2008, vol. 5, pp. 141-142. Two pages.

Sun, J. et al., "Large-scale Nanophotonic Phased Array," Nature, vol. 493, pp. 195-199, 2013. Five pages.

Vilenchik, Y. et al., "Optical Phase Lock Loop Based Phased Array Transmitter for Optical Communications," IPN Progress Report, Jet Propulsion Laboratory, California Institute of Technology, vol. 42, No. 184, 2011. Seventeen pages.

International Preliminary Report on Patentability, dated Dec. 6, 2018, from International Application No. PCT/US2017/034114, filed on May 24, 2017. 11 pages.

* cited by examiner

OPTICAL COMMUNICATIONS SYSTEM PHASE-CONTROLLED TRANSMITTER AND PHASE-CONJUGATE MIRROR RECEIVER

RELATED APPLICATIONS

This application claims the benefit under 35 USC 119(e) of U.S. Provisional Application No. 62/340,582, filed on May 24, 2016, which is incorporated herein by reference in its entirety.

BACKGROUND OF THE INVENTION

As a general rule, free-space optical communication systems have a number of advantages over other communication systems. They offer a level of security that is not present in a radiofrequency system; the optical communication signal beam can be highly collimated and directed at the intended optical receiver. In addition, optical communication links can transmit at very high data rates.

Former methods to produce such free-space optical communications systems involved the use of multiple optical receivers and high powered, mechanically steered laser optical transmitters. Since the laser beam could not be electronically steered, its direction was controlled by a mechanical gimbal system, for example. The receivers of the optical communication links in former approaches were typically based on photodiodes with optics to gather the light from the optical transmitter.

This approach is fine when the channel is stable and the platforms are not moving quickly. However, in the presence of disturbances such as atmospheric disturbance, or in the presence of motion such as encountered in mobile applications, the optical receiver must also be mechanically steered to maintain alignment to the transmitter. Further, due to the atmosphere, light from the laser is refracted in directions that do not fall on the optical receiver. Thus, mechanical steering is required at both ends of the channel. Further, multiple receivers are often required for redundancy to ensure that the optical communications link is robust against movement and disturbances.

SUMMARY OF THE INVENTION

The previous approach has drawbacks. Mechanical steeling of the optical transmitter and optical receiver is required to maintain alignment between the transmitter and receiver, and multiple receivers are needed to account for channel disturbances such as atmospheric refraction. Moreover, mechanically steered systems are large, making it difficult to have a laser optical transmitter and receiver at each end if handshaking is desired to enable error handling and correction; and without this feedback mechanism, connectivity cannot be confirmed and information can be lost if the optical communication link drops out. For example, when communicating from an unmanned aerial vehicle (UAV) to the communications node on the ground, the link can drop when a cloud goes between the UAV and the ground node, yet the UAV will have no knowledge that the channel was lost.

The present invention can be used to create a highly reliable, high speed communication links between two or more nodes. These nodes can be on many different platforms including, but not limited to, terrestrially based platforms (between mobile computing devices (e.g., cell phones), between the mobile computing devices and the cell site/tower (network), other moving platforms (e.g., automobiles, aircrafts, UAVs) and in space for communications between or to satellites. The channel is optical although various wavelengths of electromagnetic radiation could be used assuming a phased array emitter and a phase conjugate mirror are available at the desired wavelength of operation.

The present invention uses phased array transmitters and phase conjugate mirrors to complete the optical communications links. The phased array transmitters allow for electronic steering of the beams in a way that is much faster and with a potentially smaller physical footprint than mechanical systems. The phase conjugate mirrors return the received beams of photons back over the exact path they were sent from the phased array transmitters, ensuring continuity of communication even in the presence of atmospheric turbulence.

This solution can provide robust handshaking between the transmitter and the receiver. It can also account for link disturbances due to such effects as atmospheric disturbance and eliminates the need for mechanically steering either the transmitter or receiver.

The phase controlled light source and the phase conjugate mirror can be small and use very little power. These characteristics are critical for mobile applications. This small size and low power requirement make it possible to use this architecture in numerous applications.

A number of advantages can be obtained when employing the invention. For example, the implemented system can have a small form factor: The solid state nature of the phase controlled transmitter and phase conjugate minors enable extremely small transmitters and receivers. This enables free-space communications between mobile nodes including cell phones and other small devices. Further, power consumption can be lower. The beam is steered electronically and the phase controlled transmitter directs the light directly at the mirror. The phase conjugate mirror reflects the light straight back down the transmit channel, so there is little or no loss on the return trip. Thus, only a small amount of light is required to maintain handshaking between the transmitter and receiver. Finally, solid state steering of the transmit beam and phase conjugate reflection of the mirror enable high speed steering of the communications channel without the need for mechanical steering systems that are extremely slow in comparison. This will be a completely solid state communications and position tracking system. This allows two platforms to move relative to each other at a rather rapid rate while still maintaining communications. For example, this would enable a cell communications architecture in a light based communication medium. In addition, relative position (range, elevation, azimuth) and velocity can be determined, enabling a host of applications not possible with a straight forward communications channel implementation.

In general, according to one aspect, the invention features an optical communications system. The system comprises a first node comprising a phased array transmitter for generating an optical beam and a receiver, and a second node comprising a phase conjugate mirror for returning the optical beam to be detected by the receiver of the first node.

In embodiments, the first node further comprises a phase conjugate mirror for returning the beam from the second node back to the first node, and the second node comprises a receiver for detecting the beam from the phase conjugate mirror of the first node.

Other nodes can be provided, each having a phase conjugate mirror, wherein the first node communicates steering the optical beam between the other nodes in a time division multiplexed fashion.

The first node can transmit information to the second node by encoding the information into the optical beam. And, the second node can transmit information by encoding the information into the optical beam returned by its phase conjugate mirror back to the first node.

Further, the first node can determine a position of the second node by determining a time of flight of the optical beam to the second node and detected by the receiver of the first node.

In some examples, the receiver of the first node is a phased array receiver.

In general, according to another aspect, the invention features an optical communications system. The system comprises a first node comprising a first phased array transmitter for generating a first optical beam, a first phase conjugate mirror, and a first receiver. A second node then comprises a second phased array transmitter for generating a second optical beam to be returned by the first phase conjugate mirror, a second phase conjugate mirror for returning the first optical beam to be detected by the first receiver, and a second receiver for detecting the second optical beam returned by the first phase conjugate mirror.

In general, according to still another aspect, the invention features an optical communications method. The method comprises transmitting a first optical beam from a first node with a phased array transmitter, returning the first optical beam with a phase conjugate mirror at a second node, and detecting the optical beam from the phase conjugate mirror at the first node.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
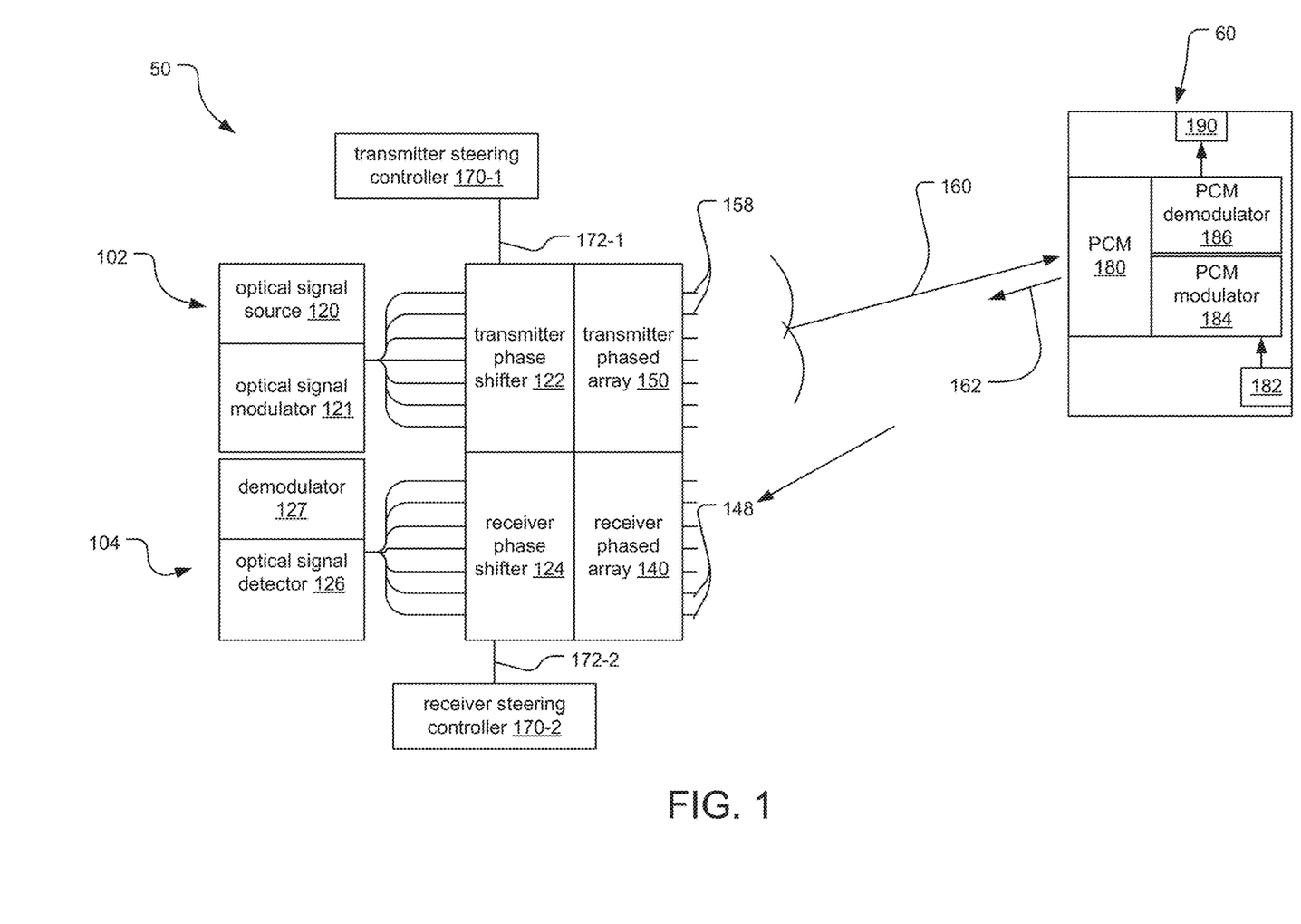
FIG. 1 is a block diagram showing a master node with a transceiver including a phased array transmitter and receiver and a target node having a receiver with a phase conjugate mirror.

FIG. 1 shows a master node 50 with a transceiver including a phased array transmitter 102 and receiver 104, and a target node 60 having a receiver with a phase conjugate mirror 180.

In more detail, a transmitter 102 includes an optical signal source 120 that generates an optical signal in the infrared, visible, or ultraviolet wavelengths. Often, the optical signal source 120 is a laser with a generally long coherence length. In the case of a communications system, the optical signal source 120 may further include an optical signal modulator 121 for modulating the optical signal from the source 120 to encode information for transmission.

The light generated by the optical signal source 120 is divided into separate optical signals and provided to a beam steering transmitter phase shifting array 122. In general, the beam steering phase shifting array 122 shifts the phase of the optical signals to steer the beam over a range of angles.

The optical signals from the phase shifting array 122 are then provided to the transmitter phased array 150. It includes a two dimensional array of optical transmission elements 158. In the illustrated example, the transmitter phased array 150 of optical transmission elements 158 comprises a two dimensional, n by m regular array of optical transmission elements 158. In some examples, n and m are each greater than a 100 or even greater than a 1000.

The transmission elements 158 emit optical signals, each with a defined phase shift relative to the others provided by the beam steering transmitter phase shifting array 122. This allows the beam to be steered, under the control of the transmitter steering controller 170-1.

Phased array transmitters operate such that the phase of the signal at each element 158 is separately controlled. Signals radiated by the various elements constructively and destructively interfere with each other in the space in front of the array 150. In directions where the signals constructively interfere, the signals are reinforced, whereas in directions where the signals destructively interfere, the signals are suppressed, thereby creating an effective radiation pattern of the entire array that favors a desired direction. The phases at the various elements 158, and therefore the direction in which the signal propagates, can be changed very quickly, thereby enabling such a system to be electronically steered, for example to sweep over a range of directions.

According to the reciprocity theorem, a phased array of elements can be used to receive signals preferentially from a desired direction. By electronically changing the phasing, a system can sweep the receive pattern over a range of directions to ascertain a direction from which a signal originates, i.e., a direction from which the signal's strength is maximum.

Sun, Watts, et al., (hereinafter "Watts") describe a phased array of optical elements. (See U.S. Pat. No. 8,988,754 and Sun, Watts, et al., "Large-scale nanophotonic phased array," Nature, Vol. 493, pp. 195-199, Jan. 10, 2013, the entire contents of each of which are hereby incorporated by reference herein for all that it discloses.) Each optical antenna emits light of a specific amplitude and phase to form a desired far-field radiation pattern through interference of these emissions.

The generated uplink beam 160 can then be transmitted to a target node 60. In the illustrated example, the target node 60 might be in an unmanned aerial vehicle (UAV) or a satellite, for example. In one example, the information transmitted by the phased array transmitter 182 on the uplink beam 160 might be flight control information in the example of a UAV target node 60. In more detail, the uplink beam 160 received by the phase conjugate mirror 180 is also decoded by a decoder 186. This information is provided to a flight control computer 190 in order to control the operation of the target node 60.

Importantly, the target node 60 includes a phase conjugate mirror (PCM) 180.

A phase conjugate mirror 180 works generically as follows. Unlike the usual Fresnel reflection, PCM reflects the incident light exactly where it came from, i.e., the wave vector directions of the incident and reflected light are negatives of each other. In this way, it functions like an electronic retroreflector. The device is extremely useful because it not only returns incident light to its source but it also refocuses light despite turbulence, optical distortion and scattering from surfaces. PCM relies on the nonlinearity nature ($\chi$) of high intensity laser beams interacting with pure or doped crystals. Typically, two anti-parallel laser beams nonlinearly interfere to create a high energy standing wave in the region of overlap. According to the Bragg condition an impinging beam of light (incident beam 160) in the overlapping region must create a reflected beam 162 such that the wave vectors of the incident beam 160 and the reflected beam 162 equal the sum of the wave vectors of the two laser beams which is zero. Thus the reflected beam has the exact opposite direction of the incident beam. Additionally, the reflected beam can have higher energy than the incident beam where the additional energy is due to energy transfer from the two laser beams.

In one example, the target node 60 modulates the phase conjugate mirror 180 in order to transmit information back to the master node 50 in the downlink beam 162. For example in one specific example, the target node 60 includes a sensor such as possibly a video camera 182. The video data generated by the camera 182 is provided to an encoder/modulator 184 that encodes the video data for transmission. Then, the encoder modulates the phase conjugate mirror 180 in order to transmit that information back down to the master node. For example in one embodiment, the encoder encodes the information by modulating the on/off state, the wavelength of the return beam 162, the phase of the return beam 162, and/or amplitude of the return beam 162 from the phase conjugate mirror 180.

In the illustrated example, the light of the downlink beam 162 is then received by a receiver 104 of the master node 50. In the illustrated example, the receiver 104 is a phased array receiver. This allows the receiver to steer its receive pattern to track the target node 60.

In more detail, detection elements 148 of a receiver phased array 140 receive the returning optical signal 162 from the phase conjugate mirror 180. The detection elements 148 of a receiver phased array 140 collect the light and provide the light to a receiver phase shifter 124. In the illustrated example, the transmitter phased array 140 of optical detection elements 148 comprises a two dimensional, n by m regular array of optical detection elements 148. In some examples, n and m are each greater than a 100 or even greater than a 1000.

The receiver phase shifter 124 applies a phase shift to the feed from each one of the detection elements 148 and then combines the optical signals for detection by an optical signal detector 126.

Detection of the returning optical signal 162 ensures the integrity of the optical communications link between the master node 50 and the target node 60. The link integrity is validated since the photons transmitted in the uplink 160 from the phased array transmitter 102 are returned in the downlink 162 by the phase conjugate minor and then detected by the phased array receiver 140.

Moreover, in the illustrated example, the signal from the optical signal detector 126 is further demodulated by the demodulator 127. In the illustrated example, the demodulator extracts the video data that was encoded in the returning optical signal 162 by the modulation of the phase conjugate mirror 180 in response to the video data from the camera 182.

According to the invention, steering controllers 170-1, 170-2 are provided for each of the transmitter 102 and the receiver 104. These steering controllers 170-1, 170-2 each generate respective steering signals 172-1, 172-2 to guide the uplink beam 160 to the target node 60 and receive the downlink beam 162 from the target node 60.

The present system can also be used to limit power dissipation, especially when battery power must be used, such as in the example of a UAV. One of the key advantages of the phase array transmitter 102 and phase conjugate mirror 180 architecture is that photons that make it to the mirror 180 can be exactly returned down the link. This means that a low power transmitter will be able to find and focus on the mirror 180 without the need for a supplemental high power laser to perform the search function. The phase array transmitter 102 can sweep across the field of view and when the phase conjugate mirror 180 returns photons, the transmitter 102 will know where the mirror 180 is because it knows where it scanned the beam. The transmitter 102 can immediately lock onto the mirror 180 with very little power dissipation due to the efficiency of the reflected signal. Once the connection between the transmitter 102 and mirror 180 is made, the transmitter 102 can continue to scan over small angles from the confirmed location, measuring the reflected signal returned from the mirror 180 to maintain lock. The return signal will confirm that the link is intact and when there is interference, the transmitter 102 will know immediately due to the handshaking architecture. The transmitter 102 can reseed information as necessary.

For systems in benign environments where the transmitter 102 and minor 180 are not moving, the data rate can be extremely high. For more turbulent environments where the transmitter 102 and mirror 180 (or transceivers) are moving relative to each other, the data rate will be reduced by the amount of time necessary to maintain lock. However, since the steering is fast and solid state, and the reflection is completely directed back to the transmitter, the loss of channel lock will be short and lock can be rapidly reestablished.

Figure 2:
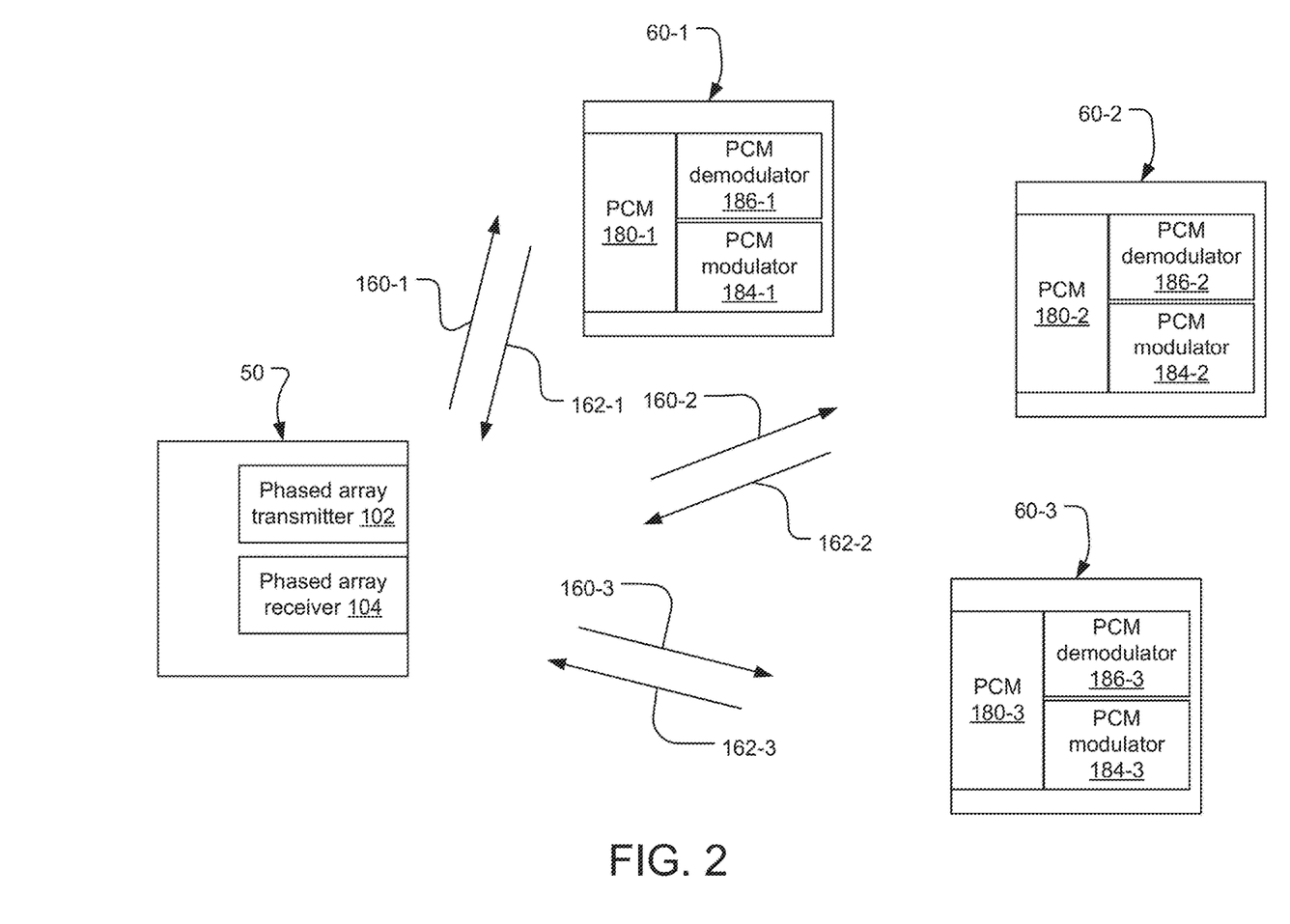
FIG. 2 is a block diagram showing a phased array transmitter of a master node scanning between multiple network target nodes and communicating with the target nodes in a time division multiplexed fashion.

FIG. 2 shows a phased array transmitter of a master node 50 scanning between multiple network target nodes 60-1, 60-2, 60-3 and tracking the target nodes in a time division multiplex fashion.

In the illustrated example, a single master node 50 establishes separate communication links with three separate target nodes 60-1, 60-2, 60-3. Each of the separate target nodes includes a respective phase conjugate mirror 180, a phase conjugate mirror demodulator 186 and a phase conjugate mirror modulator 184. This allows the target nodes to decode information transmitted on the respective uplinks 160-1, 160-2, 160-3 from the master node 60 and also transmit information on the corresponding downlinks 162-1, 162-2, 162-3 to the master node 50.

One specific example, each of the separate communications links 160-1/162-1, 160-2/162-1 and 160-3/162-3 are maintained by the master node 50 in a time division multiplexing scheme. Specifically, the master node 50 successively establishes links with each of the separate nodes 60-1, 60-2, 60-3, in a round robin fashion.

For context, in the previous embodiment of FIG. 1, the validation of the communications link 160-162 could be performed by the master node 50, when it received the downlink beam 162 returned by the phase conjugate mirror 180 at its phased array receiver 104. The target node 60, however, could not validate the link except for the uplink portion 160.

Figure 3:
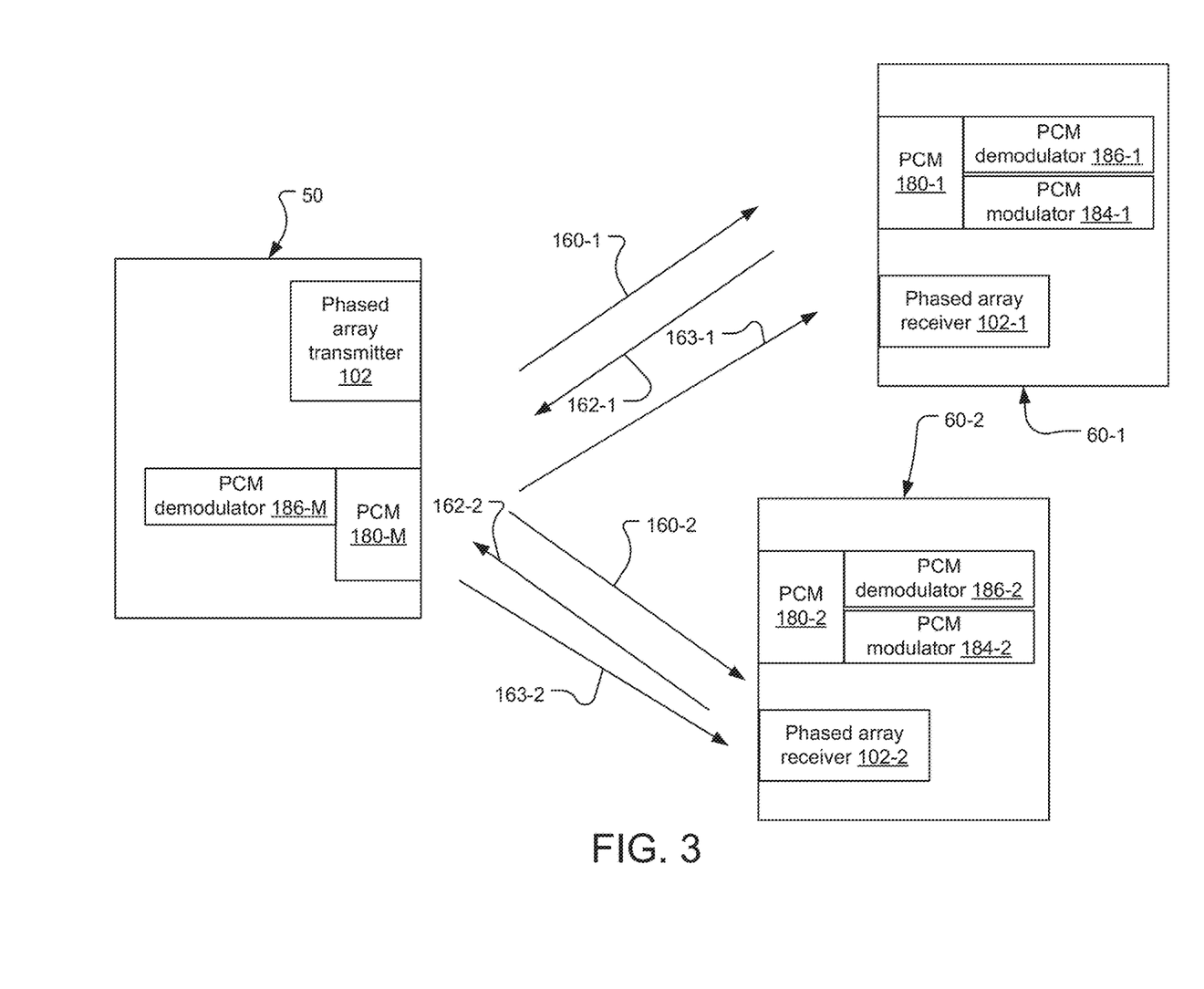
FIG. 3 is a block diagram showing a master node with a transceiver including a phased array transmitter and phase conjugate mirror, and two target nodes having a receiver with a phase conjugate mirror.

FIG. 3 is a block diagram showing a master node with a transmitter 102 and phase conjugate mirror 180-M and target nodes, each having a receiver 102 with a phase conjugate mirror 180.

In the embodiment, both the master node 50 and the target nodes 60 each validate their respective communications links 160/162. In more detail, the master node 50 includes a phased array transmitter 102 as described previously; it transmits the uplink beams 160-1, 160-2 to the target nodes 60-1, 60-2, respectively. In the illustrated example, this can occur in a time multiplex fashion. Moreover, as described previously, the uplink beams 160-1 and 160-2 can contain information such as UAV control signals from the master node 50 to each of the target nodes 60-1, 60-2.

The uplink beams 160-1 and 160-2 are received by the respective phase conjugate mirrors 180-1, 180-2 of each of the target nodes 60-1, 60-2. As before, a phase conjugate mirror demodulator 186 can decode the incoming beam and extract any commands or other information that is contained in the uplink beams 60-1, 60-2.

Through the operation of the phase conjugate mirrors 180-1, 180-2, for each of the target nodes 60-1, 60-2, the downlink beams 162-1, 162-2 are returned to the master node 50, and possibly encoded with information from the modulators 184-1, 184-2.

In the illustrated example, the master node 50 also includes a phase conjugate mirror 180-M. This phase conjugate mirror returns the downlink beams 162-1 as secondary uplink beams 63-1, 163-2.

As before, the downlink beams 162-1, 162-2 from each of the target nodes 60-1, 60-2 also transmit information from the respective target nodes. This functionality is provided by the phase conjugate mirror modulators 184-1, and 184-2 in each of the target nodes. The information contained in the downlink beams 162-1, 162-2 can be extracted by the master node using its phase conjugate mirror demodulator 186-M.

For each of the target nodes 60-1, 60-2, an additional phased array receiver is provided. Specifically target node 60-1 includes a phased array receiver 102-i, whereas target node 60-2 includes a phased array receiver 102-2. These phased array receivers can have the same construction as the phased array receiver 102 of the master node 50 as described previously.

These secondary uplink beams 163-1, 163-2 as received by the target nodes by the respective phased array receivers 102-1, 102-2 allow the target nodes 60 to validate the respective optical links. Specifically, in this example, a photon will be transmitted from the phased array transmitter 102 of the master 50 then returned by one of the respective phase conjugate mirrors 180-1, 180-2 of the target nodes 60-1, 60-2 and then be received by the phase conjugate mirror 180-M of the master. This will provide the master node with the validation of the corresponding link to that node. Further, when the phase conjugate mirror 180-M of the master node 50 returns that beam as the secondary uplink beam 163 to the respective phased array receiver 102-1, 102-2 of the respective target node 60-1, 60-2, then the target nodes will receive confirmation that the link has been validated in both the uplink and downlink directions.

Figure 4:
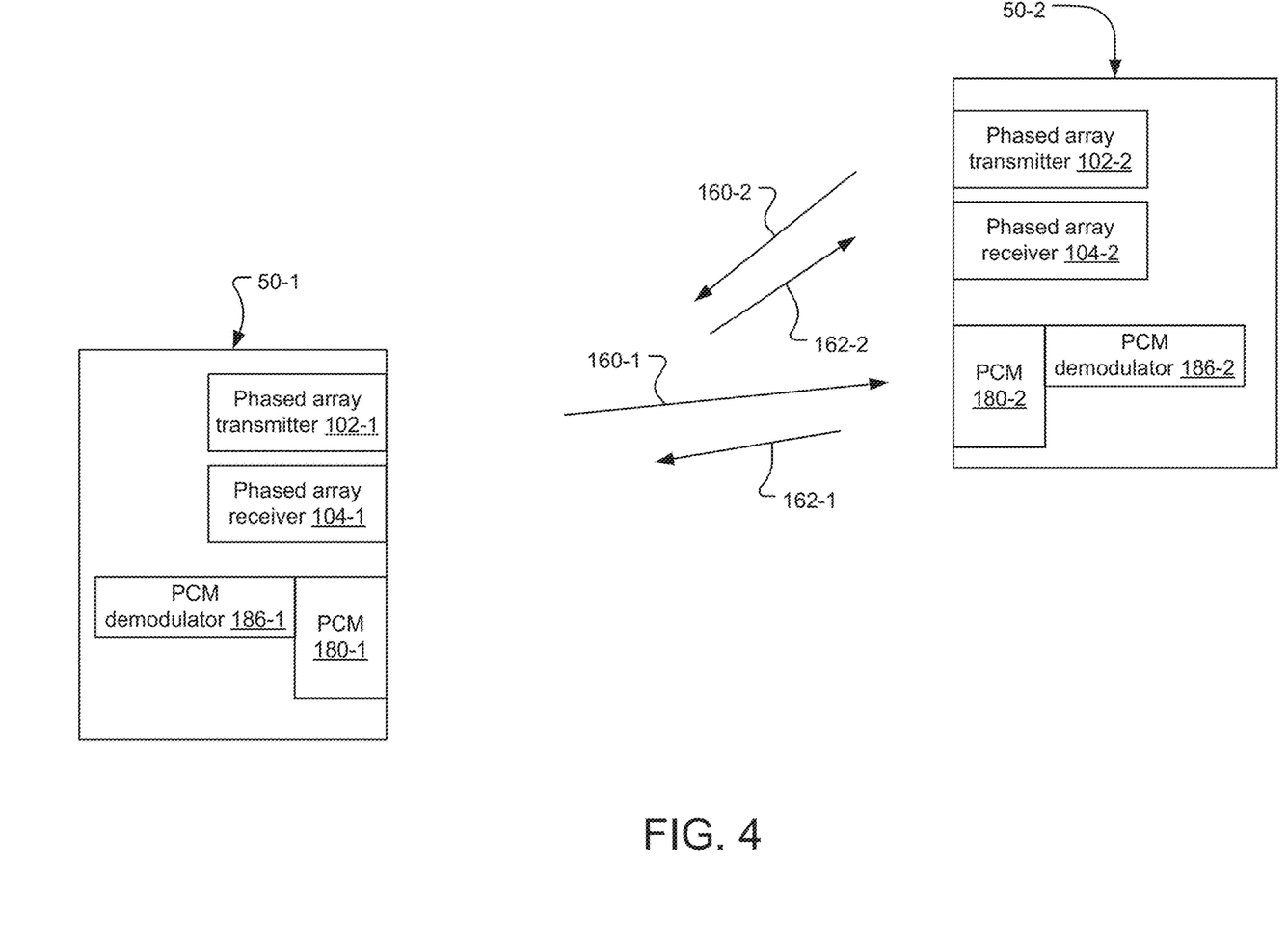
FIG. 4 is a block diagram showing two master nodes operating as peers, each with a transceiver including a phased array transmitter and phase conjugate mirror, supporting two links operating at different wavelengths to avoid interference.

FIG. 4 shows two nodes operating as peers, each with a transceiver including a phased array transmitter 102 and phase conjugate mirror 180, supporting two links possibly, operating at different wavelengths to avoid interference.

In more detail, each of the nodes 50-1, 50-2 includes a respective phased array transmitter 102-1, 102-2 and a phased array receiver 104-1, 104-2. These phased array transmitters 102 and receivers 104 are similar to those as described previously. Each of these nodes, however, further includes a respective phase conjugate mirror 180-1, 180-2. Specifically, node 50-1 includes a phase conjugate mirror 180-1; node 50-2 includes phase conjugate mirror 180-2.

The provision of phase conjugate mirrors 180 in each of the nodes 50 allows each node to independently validate the optical communication links between the nodes. For example, master node 50-1 transmits the uplink beam 160-1 using its phased array transmitter 102-1. The phase conjugate mirror 180-2 of the second node 50-2 returns the downlink beam 162-2. This downlink beam is then received by the phased array receiver 104-1 of the first node 50-1. Any information transmitted in the uplink beam 160-1 can be decoded by the phase conjugate mirror demodulator 186-2 of the node 50-2. In this way, information can be transmitted from the first node 50-1 to the second node 50-2 and the first node can validate that that information was received by the second node 50-2.

At the same time, the second node 50-2 can validate the communications link with the first node 50-1. Specifically, the downlink beam 160-2 generated by the phased array transmitter 102-2 of the second node 50-2 is transmitted to the phase conjugate mirror 180-1 of the first node 50-1. This phase conjugate mirror 180-1 returns the beam as an uplink beam 160-2 that is received by the phased array receiver 104-2 of the second node 50-2. Any information contained in the downlink beam 160-2 from the second node 50-2 can be extracted by the phase conjugate mirror demodulator 186-1 at the first node 50-1. As a result, the second node 50-2 also has confirmation that the communications link to the first node 50-1 is also operational.

Figure 5:
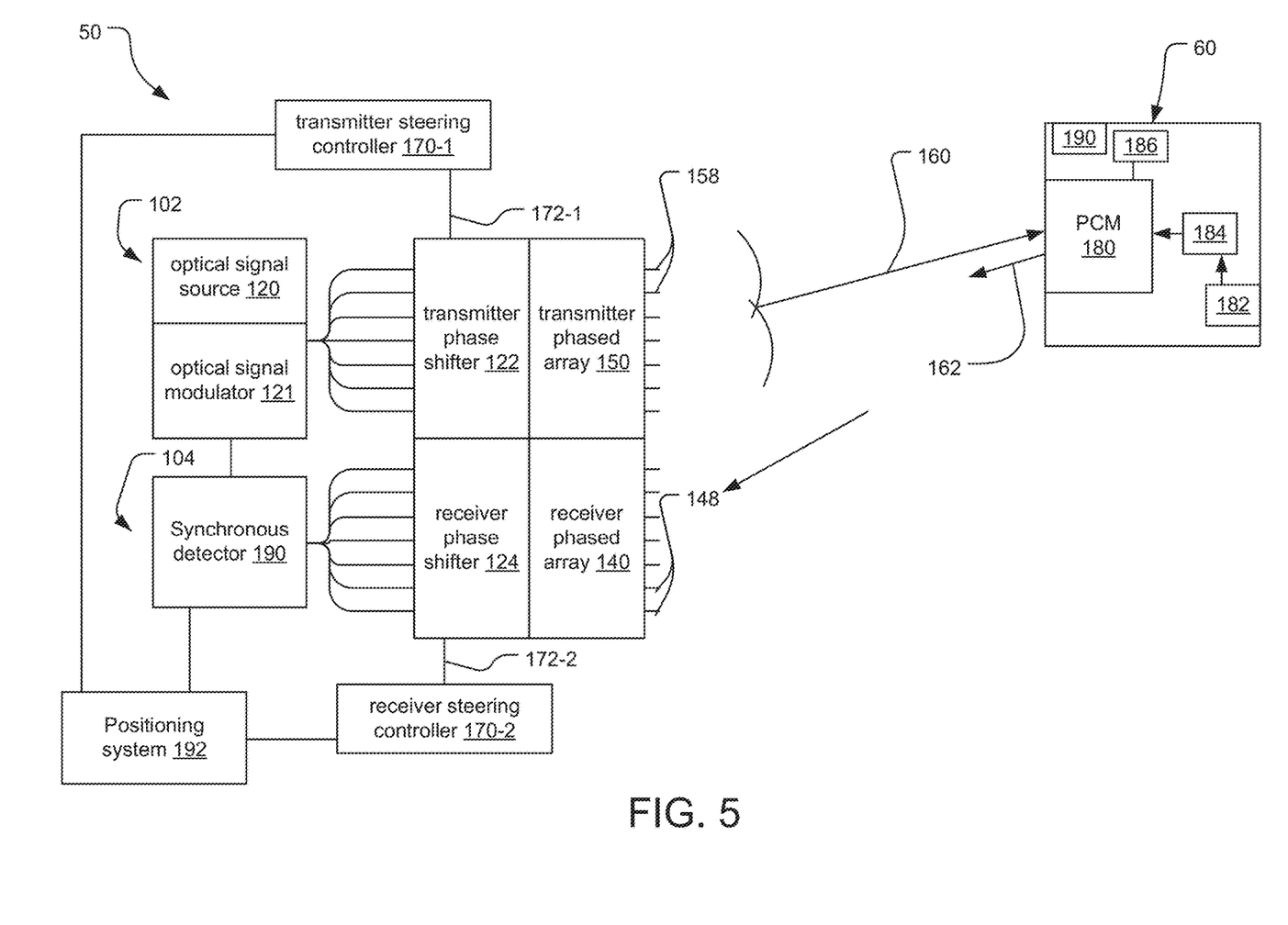
FIG. 5 is a block diagram showing time of flight tracking of the node and providing position and time information in a GPS denied environment.

FIG. 5 shows time of flight tracking of the target node 60 that can be used to provide position and time information, such as in a Global Navigation Satellite System, e.g., Global Positioning System (GPS), denied environment.

The use of the phase conjugate mirror 180 on the target node 60 allows the position of the target node 60 to be resolved by the master node 50. Specifically, the transmitter steering controller 170-1 controls the phased array transmitter 102 to track the target node 60. This provides both azimuth and elevation information given the two-dimensional tracking of the two-dimensional phase array 150. Similar information is also provided by the receiver steering controller 170-2.

On the other hand, the range to the target 60 is resolved by calculating the time-of-flight of the uplink beam 160 and the downlink beam 162 to and from the target node 60. In the illustrated example, a synchronous detector 190 determines the delay between the uplink beam 160 and the downlink beam 162 to extract the range to the target 60. A positioning system 192 then resolves the position of the target such as in a GPS denied environment, by combining the information from the steering controllers 170-1, 170-2 and the range information provided by the synchronous detector 190.

Since the phase conjugate mirror 180 at the target node 60 reflects all the photons directly down the communications link, this ranging can be done without the need for a high power laser such as that necessary in a LiDAR ranging system where most of the light is not reflected and the reflective surfaces are of unknown reflectance and angle. This greatly reduces the power necessary to determine the distance between the master node 50 and the target node 60. This could be valuable in applications where both distance and angle between nodes and communications between nodes are desired. For example, self driving automobiles could benefit from this feature where the automobiles would need to know their position relative to each other as well as be able to communicate information about their status to ensure that they do not collide.

PCM 180

Figure 6A:
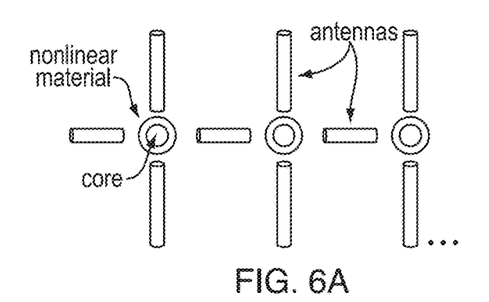
FIGS. 6A and 6B show an example of a nonlinear metasurface structure that enables a phase conjugate mirror through the properties of the material.
Figure 6B:
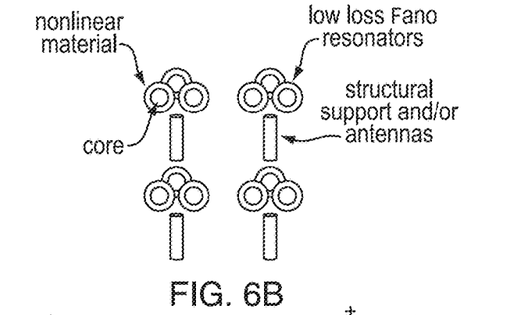

FIGS. 6A and 6B show nano structures with high non-linearly that could be used to make a phase conjugate mirror on a chip. The high nonlinearity ($\chi$) of laser interaction with materials is essential for high performance PCMs. In the 700-900 nm (red visible to IR) range, a directed fluidic assembly (DFA) technology using Engineered Optical Materials (EnMats) is used in one embodiment. The schematics of potential EnMat structure for use in a phase conjugate mirror are shown. In FIG. 6A, the nanorod array serves as a nanophotonic structure optimized to maximize the intensity of the incoming light in the nanospheres, which are core-shell structures containing nonlinear material with intrinsically high $\chi$. In FIG. 6B, also shown is a more complex EnMat that relies on an array of non-metallic Fano resonators made from a low loss Si core and nonlinear transparent CdS shell.

Other PCM materials include plasmonic metasurfaces (thin conductor-dielectric composite materials) used to realize high value of nonlinearity (Lee et al., "Giant nonlinear response from plasmonic metasurfaces coupled to intersubband transitions,", Nature, vol. 511, no. 7507, pp. 65-69, 2014). They report creating a 28 layer multi quantum well (MQM) structure, which, when pumped with a light of frequency $\omega$, emits at frequency $2\omega$. The resulting high nonlinear response makes it suitable for use in manufacturing phase conjugate minors. The highest nonlinearity occurs in the infrared.

Figure 7A:
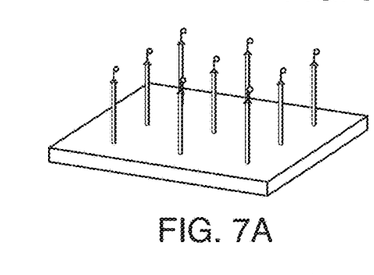
FIGS. 7A, 7B, 7C, 7D and 7E show a second embodiment of the phase conjugate mirror that combines a photonic antenna structure with engineered non-linear elements at the nodes of the antennae.
Figure 7B:
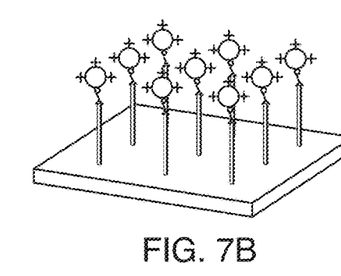
Figure 7C:
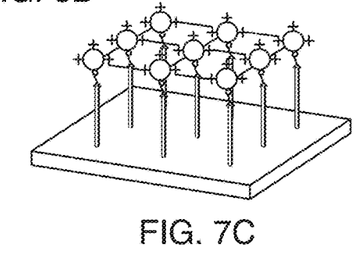
Figure 7D:
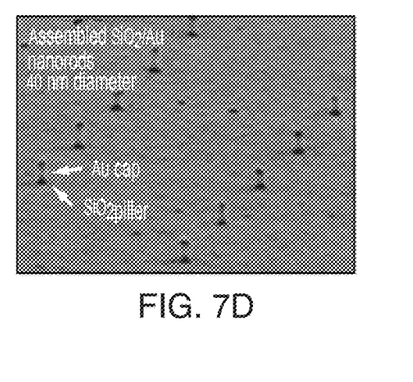
Figure 7E:
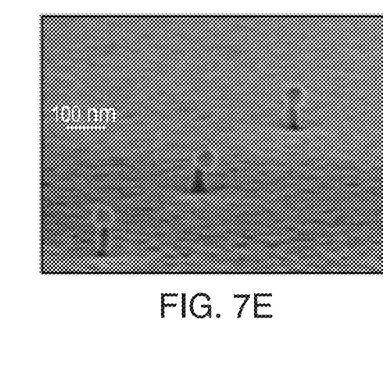

FIGS. 7A-7E show one layer of PCM assembly using EnMat structures shown in FIGS. 6A and 6B, and scanning electron micrographs of the surface. FIG. 7A, FIG. 7B and FIG. 7C show the layout of nano structures of FIG. 6A. FIG. 7D identifies the caps and pillars for the layouts of FIG. 7A, FIG. 7B and FIG. 7C. FIG. 7E gives a rough idea of the nano surface, which is about 1 micrometer in length and width. These architectures offer significant reduction in SWaP (Size, Weight and Power) in PCM manufacturing.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical communications system, comprising:
   a first node comprising a phased array transmitter for generating an optical beam, and a receiver; and
   a second node comprising a phase conjugate mirror for returning the optical beam to be detected by the receiver of the first node;
   wherein the first node controls the phased array transmitter to track the second node and transmits information to the phase conjugate mirror of the second node by encoding the information into the optical beam; and
   wherein the phase conjugate mirror comprises a nanorod array or metamaterial structures for non-linearity enhancement.

2. The system as claimed in claim 1, wherein the first node further comprises a phase conjugate mirror for returning the beam from the second node back to the second node, and the second node comprises a receiver for detecting the beam from the phase conjugate mirror of the first node.

3. The system as claimed in claim 1, further comprising other nodes, each having a phase conjugate mirror, wherein the first node scans the optical beam between the other nodes in a time division multiplexed fashion.

4. The system as claimed in claim 1, wherein the second node transmits information to the first node by encoding the information into the optical beam returned by the phase conjugate mirror.

5. The system as claimed in claim 1, wherein the first node determines a position of the second node by determining a time of flight of the optical beam to the second node and detected by the receiver of the first node.

6. The system as claimed in claim 1, wherein the receiver of the first node is a phased array receiver.

7. The system as claimed in claim 6, wherein the phased array receiver and the phased array transmitter both track the second node.

8. An optical communications system, comprising:
   a first node comprising a first phased array transmitter for generating a first optical beam, a first phase conjugate mirror, and a first receiver, wherein the first phase conjugate mirror comprises a nanorod array or metamaterial structures for non-linearity enhancement; and
   a second node comprising a second phased array transmitter for generating a second optical beam to be returned by the first phase conjugate mirror, a second phase conjugate mirror for returning the first optical beam to be detected by the first receiver, and a second receiver for detecting the second optical beam returned by the first phase conjugate mirror, wherein the second phase conjugate mirror comprises a nanorod array or metamaterial structures for non-linearity enhancement.

9. The system as claimed in claim 8, wherein the first receiver and the second receiver are phased array receivers.

10. An optical communications method, comprising:
encoding information into a first beam;
transmitting a first optical beam from a first node with a phased array transmitter and tracking a second node with the beam;
returning the first optical beam with a phase conjugate mirror at the second node; and
detecting the optical beam from the phase conjugate mirror at the first node; and
the transmitter continuously scanning over small angles and measuring the returning beam from the mirror to maintain a lock on the mirror.

11. The method as claimed in claim 10, further comprising:
returning the optical beam from the first node to the second node with phase conjugate mirror of the first node; and
detecting the optical beam from the phase conjugate mirror of the first node at the second node with a receiver of the second node.

12. The method as claimed in claim 10, further comprising the first node transmitting the first optical beam to other nodes in a time division multiplexed fashion.

13. The method as claimed in claim 10, further comprising the second node transmitting information to the first node by encoding the information into the optical beam returned by the phase conjugate mirror.

14. The method as claimed in claim 10, further comprising the first node determining a position of the second node by determining a time of flight of the optical beam to the second node and detected by the receiver of the first node.

15. The method as claimed in claim 10, wherein the receiver of the first node is a phased array receiver.

16. The method as claimed in claim 15, wherein the phased array receiver and the phased array transmitter both track the second node.

17. An optical communications system, comprising:
a first node comprising a phased array transmitter for generating an optical beam, and a receiver; and
a second node comprising a phase conjugate mirror for returning the optical beam to be detected by the receiver of the first node;
wherein the first node controls the phased array transmitter to track the second node and transmits information to the phase conjugate mirror of the second node by encoding the information into the optical beam; and
wherein the transmitter continuously scans over small angles measuring the returning beam from the mirror to maintain a lock on the mirror.

* * * * *